(12) United States Patent
Narayan et al.

(10) Patent No.: US 11,615,363 B2
(45) Date of Patent: Mar. 28, 2023

(54) DIGITAL CHAT CONVERSATION AND VIRTUAL AGENT ANALYTICS

(71) Applicant: ServiceNow, Inc., Santa Clara, CA (US)

(72) Inventors: Ashita Narayan, Hyderabad (IN); Wenhua Li, Palo Alto, CA (US); Yuko Araki, Los Gatos, CA (US); Gaurav Goyal, San Jose, CA (US); Lalit Kumar, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/152,648

(22) Filed: Jan. 19, 2021

(65) Prior Publication Data

US 2022/0230113 A1 Jul. 21, 2022

(51) Int. Cl.
| | | |
|---|---|---|
| *G06Q 10/06* | (2012.01) | |
| *H04L 51/02* | (2022.01) | |
| *G06Q 10/0637* | (2023.01) | |
| *G06Q 10/0639* | (2023.01) | |
| *G06Q 10/0633* | (2023.01) | |

(52) U.S. Cl.
CPC ... *G06Q 10/06375* (2013.01); *G06Q 10/0633* (2013.01); *G06Q 10/06393* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 10,818,293 B1 * | 10/2020 | Orkin | G06F 16/9038 |
| 2017/0048170 A1 * | 2/2017 | Smullen | H04L 67/02 |
| 2018/0129484 A1 * | 5/2018 | Kannan | G06F 3/0482 |
| 2018/0234367 A1 * | 8/2018 | Lange | H04L 51/08 |
| 2019/0236155 A1 * | 8/2019 | Bachrach | G06F 16/3329 |
| 2019/0286698 A1 * | 9/2019 | Gupta | G06F 40/35 |
| 2019/0347326 A1 * | 11/2019 | Kozhaya | G06F 40/35 |
| 2020/0342381 A1 * | 10/2020 | Panikkar | G06Q 10/0633 |
| 2021/0006515 A1 * | 1/2021 | Downs | G06F 16/93 |

OTHER PUBLICATIONS

Sangroya, "Chatbot as an Intermediary between a Customer and the Customer Care Ecosystem," 2017, In Proceedings of the 9th International Conference on Management of Digital EcoSystems, pp. 128-133 (Year: 2017).*

* cited by examiner

*Primary Examiner* — Ivan R Goldberg
(74) *Attorney, Agent, or Firm* — Van Pelt, Yi & James LLP

(57) ABSTRACT

Analytic data about digital chat conversations taking place within a digital workflow environment is tracked and stored. The analytic data tracks conversation progression states between individual node elements of at least one digital chat conversation flow design. A specification of an interested event for the analytic data is received. Data associated with the interested event is extracted and provided for analysis.

20 Claims, 14 Drawing Sheets

FIG. 10

| ☐ | ≡ Event<br>Completed Interactions | | | 📎 | | ⋮⋮⋮ | ⋯ | [Update] [Delete] | ← → |
|---|---|---|---|---|---|---|---|---|---|

Custom Name ☐
\*Name [Completed Interactions]
Custom Type ☐
Type [Custom ⌄]
\*Source Table [Interaction [interaction]]
Source Table Filter [Add Filter Condition] [▶]
[State] [is ⌄] [Closed Complete ⌄] [✕]
[Add "OR" Clause] [AND] [OR]

Application [Global]
Active ☑
Event Time ☐
Apply Post Fetch Filter ☐

\*Conversation Mapping Field [Channel Metadata Record]

[Update] [Delete]

| ≡ | Event Properties [New] [Search] [Name ▼] [Search] | | ◁◁ ◁ [1] to 3 of 3 ▷ ▷▷ | ⊞ |
|---|---|---|---|---|

▷⚙ Event = Completed Interactions

| | ☰ Name ▲ | ≡ Advanced | ≡ Event Source Table | ≡ Value Field | ≡ Value Script |
|---|---|---|---|---|---|
| ☐ ⓘ | Reason | false | interaction | state_reason | |
| ☐ ⓘ | Type of Interaction | false | interaction | type | |
| ☐ ⓘ | Virtual Agent Initiated Chat | false | interaction | virtual_agent | |

[Actions on selected rows... ⌄]  ◁◁ ◁ [1] to 3 of 3 ▷ ▷▷

1000

DIGITAL CHAT CONVERSATION AND VIRTUAL AGENT ANALYTICS

BACKGROUND OF THE INVENTION

Virtual agents such as chat or conversation bots and virtual assistants allow user interactions to be automated using digital workflows. Virtual agents can be used, for example, to help resolve customer problems as well as employee issues. As a few example scenarios, using a virtual agent, a customer can initiate a product return and query the operating hours of a business. Similarly, an employee can submit an expense report and book travel arrangements. Typically, a virtual agent is configured with one or more digital workflows. A digital workflow can include and address different topics in anticipation of the needs of the user of the virtual agent. When a user interacts with a virtual agent, the user's intent is determined and mapped to one of the topics of a digital workflow. Each topic is configured with a corresponding topic workflow that helps to address the user's issue, for example, by stepping through the problem. As new needs arise, workflows and topics can be added or modified to improve the automated responses of a virtual agent.

BRIEF DESCRIPTION OF THE DRAWINGS

Various embodiments of the invention are disclosed in the following detailed description and the accompanying drawings.

FIG. 10 is a diagram illustrating an embodiment of a user interface for configuring an interested event for a virtual agent digital chat conversation.

DETAILED DESCRIPTION

Figure 1:
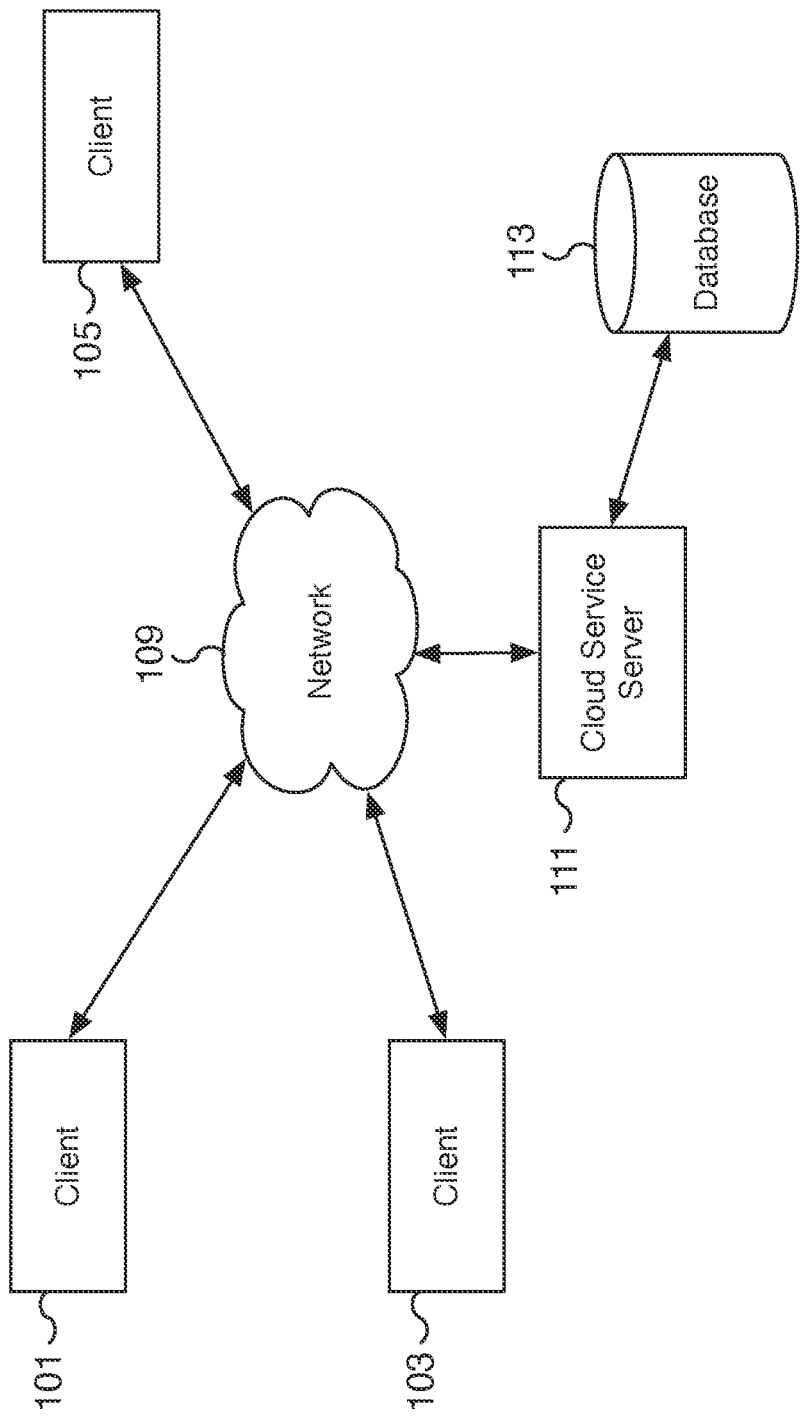
FIG. 1 is a block diagram illustrating an example of a network environment of a virtual agent service for performing automated chat conversations.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Analytics for digital chat conversations performed over virtual agents are disclosed. Using the techniques described herein, digital chat conversations using virtual agents can be tracked and analyzed for analytic metrics. For example, an operator can configure a digital workflow for a virtual agent that addresses multiple topics. Within each topic, a progression through a workflow of element nodes allows the virtual agent to automate the resolution of a user's issue associated with the determined topic. In various embodiments, the progression through the digital workflow is tracked and analyzed for analytical data. For example, key metrics, such as whether a user's issue was resolved, can be calculated for each digital chat conversation. The calculation of the key metrics can be calculated by running a formula script on the conversation data. In various embodiments, the formula script can be a custom script depending on the appropriate metric and metric format desired. Using the disclosed techniques, for each of the configured digital chat conversation analytics, the configuration process requires little to no programming knowledge.

In some embodiments, the conversation is further evaluated to determine whether the conversation includes one or more interested configured events. The interested events can be configured by defining an event condition and event attributes. Conversations that match the event definition are additionally tracked along with corresponding event attributes. The ability to configure custom event tracking allows an operator to detect whether specific events occur during digital chat conversations and the properties of their occurrence. In some embodiments, the analytic data of individual chat conversations is aggregated for additional analytical analysis. For example, aggregate analytics of key metrics and event data can be presented to a user via a web dashboard. Additional views for monitoring the digital conversations can also be configured. For example, a funnel view can be defined that depicts how one or more conversations progress through specific defined steps, such as a sequence of events. At each step, only a portion of the aggregated digital chat conversations may progress to the next step. By presenting the conversations via a funnel view, an operator can visualize event progression across multiple instances of virtual agent conversations. Using the disclosed techniques, analytic data such as key conversation metrics, events identified from conversations and their associated event attributes, and aggregate analytics are extracted from tracked digital conversations with virtual agents and made accessible to operators. The provided virtual agent analytics can be used to further improve the digital workflow of the virtual agent for future digital chat conversations. In some embodiments, the virtual agent is implemented as a chat or conversation bot or a virtual assistant. In some embodiments, the virtual agent is a web-based virtual agent, a stand-alone desktop or mobile application, or an integrated component or plugin to a larger software application or platform such as a group messaging platform.

In some embodiments, a virtual agent is deployed and utilized by clients to perform digital chat conversations. The virtual agent is configured to follow a digital workflow. For example, the digital workflow can be used to map a client's intent to one of multiple topics included in the workflow. Each topic in the workflow can include one or more node elements or states. Analytic data about digital chat conversations taking place within a digital workflow environment is tracked and stored. In some embodiments, the analytic data tracks conversation progression states between individual node elements of at least one digital chat conversation flow design. For example, the node elements that each digital chat conversation transitions through and the ordering of the transitions are tracked and stored. In various embodiments, the tracked analytic data is stored, at least temporarily, in a local data store before additional processing, such as event analysis and aggregation, is performed.

In some embodiments, a specification of an interested event for the analytic data is received. For example, an operator can configure interested events associated with digital chat conversations via a user interface to a cloud service. The conversation data with virtual agents can be analyzed to identify matches to the configured event conditions. For example, an interested event can be configured to identify a completed interaction, the issuance of an automated resolution, or another event condition. Each configured interested event can also specify attributes associated with the event that should be tracked. For example, a completed interaction event can include attributes such as the type of interaction, the reason for the interaction, and whether the virtual agent initiated the conversation, among others. In various embodiments, the configured interested event is mapped to a database table and the attributes of the event can be mapped to fields of the database table or scripts that utilize the fields of the database table. In some embodiments, data associated with the interested event is extracted. For example, tracking data of a digital chat conversation is analyzed to determine whether the conversation matches an interested event. The tracking data can be used to determine that an interested event occurred and to determine the event attributes associated with the event's occurrence. The determined event data can be stored, at least temporarily, in a local data store before being extracted for additional analysis, such as aggregation analysis.

In some embodiments, the extracted data is provided for analysis. For example, the extracted data can be used to determine the number of instances that an interested event occurred among a set of conversations and analytics of the aggregated event attributes for the event occurrences. In some embodiments, the data is provided to an analytics aggregation engine where data from multiple chat conversations is aggregated and analyzed. For example, a funnel view can be created to identify conversations with events that match a certain sequence of steps. At each step, the funnel view can display the number of conversations that continue from one step to the next. Utilizing the appropriate funnel view, an operator can identify which events in the conversation flow are associated with drops and to quantify the impact of those drops.

FIG. 1 is a block diagram illustrating an example of a network environment of a virtual agent service for performing automated chat conversations. In the example shown, clients 101, 103, and 105 are example clients for accessing virtual agent services provided by cloud service server 111 via network 109. The clients, such as client 101, 103, and 105, can be chat, messaging, voice, or other forms of virtual agent clients. The virtual agent services offered by cloud service server 111 include both a virtual agent conversation service as well as an analytics engine and corresponding dashboard for viewing analyzed analytics associated with the use of the virtual agent. Network 109 can be a public or private network. In some embodiments, network 109 is a public network such as the Internet. In various embodiments, clients 101, 103, and 105 are network clients such mobile devices, desktop computers, laptops, kiosks, or other computing devices for accessing web and/or online services.

In some embodiments, cloud service server 111 provides cloud services including an online virtual agent and a cloud-based analytics engine and corresponding dashboard. In some embodiments, cloud service server 111 provides services for generating and configuring a virtual agent as well as the ability to configure the range and type of analytic metrics to capture and how to view them. For example, an operator can configure the digital workflow including the topics and related node elements of a virtual agent via cloud service server 111. Similarly, an operator can configure the analytics to capture from digital chat conversations with a virtual agent including interested events, attributes from interested events, and aggregate analytics via cloud service server 111. In various embodiments, the aggregate analytics can be automatically aggregated based identified data types. Data tracked, for example, as Boolean, string, and numeric data, can be automatically aggregated differently based on the properties of the data type. As one example, numeric data can be aggregated and aggregate analytics such as min, max, sum, average, count, mode, and other statistical aggregate analytics can be determined. In various embodiments, an operator can access a dashboard to view the processed analytics, for example, via a web client.

In some embodiments, digital chat conversations are carried out by a user of clients 101, 103, or 105 using a virtual agent client that connects to virtual agent service components of cloud service server 111. For example, a virtual agent client component can run on clients 101, 103, and 105 and a corresponding virtual agent server component can run on cloud service server 111. In some embodiments, an operator can configure a virtual agent and interested analytics using clients 101, 103, and/or 105 via a virtual agent configuration interface of cloud service server 111.

In various embodiments, cloud service server 111 can utilize database 113 to provide certain services such as virtual agent and virtual agent analytics services. For example, database 113 can be used to store configuration settings for virtual agents and configuration settings associated with virtual agent analytics. Database 113 can also be used to store conversation data from virtual agents including tracking data associated with the progression states between individual node elements of a digital chat conversation flow. In various embodiments, database 113 is used to store analyzed analytic data of digital chat conversations including aggregated analytic data, which can be provided to users via different user interface views of a dashboard service. In some embodiments, database 113 can be a configuration management database (CMDB) used by cloud service server 111 for providing CMDB services. Among other information, database 113 can store configuration information related to managed assets, such as related hardware and/or software configurations.

Although single instances of some components have been shown to simplify the diagram, additional instances of any of the components shown in FIG. 1 may exist. For example, cloud service server 111 may include one or more servers. Similarly, database 113 may not be directly connected to cloud service server 111 and/or may be replicated or distributed across multiple components. In some embodiments, the server(s) for generating and configuring a virtual agent, hosting the generated server components of the virtual agent, tracking virtual agent conversations, and providing analyzed virtual agent analytics via a dashboard are different servers of cloud service server 111. As another example, clients 101, 103, and 105 are just a few examples of potential clients to cloud service server 111. Fewer or more clients can connect to cloud service server 111. In some embodiments, components not shown in FIG. 1 may also exist.

Figure 2:
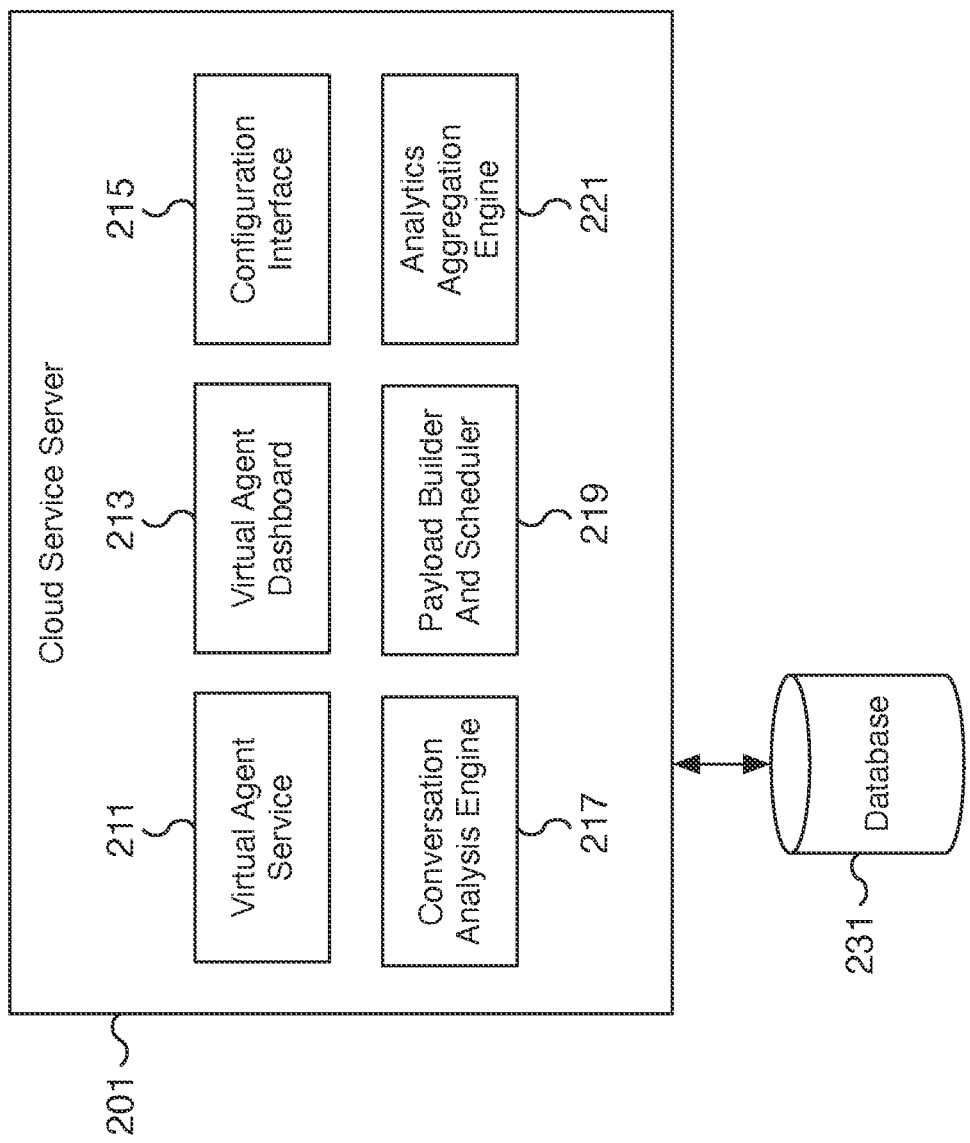
FIG. 2 is a block diagram illustrating an example of a virtual agent framework of a cloud service server for providing virtual agent services.

FIG. 2 is a block diagram illustrating an example of a virtual agent framework of a cloud service server for providing virtual agent services. In the example shown, cloud service server 201 is shown with virtual agent components including virtual agent service 211, virtual agent dashboard 213, configuration interface 215, conversation analysis engine 217, payload builder and scheduler 219, and analytics aggregation engine 221 and is communicatively connected to database 231. In some embodiments, cloud service server 201 is cloud service server 111 of FIG. 1 and database 231 is database 113 of FIG. 1. In various embodiments, cloud service server 201 is connected to a network such as network 109 of FIG. 1.

In some embodiments, the virtual agent components of cloud service server 201 work together to provide virtual agent services. Although not shown, the various virtual agent components can be interconnected and can access database 231 for storing and/or retrieving virtual agent data such as tracking data, analytic data, and aggregated data. In various embodiments, database 231 may also store configuration data including digital workflow configurations and analytic configurations such as customized key metric formula scripts, chat conversation event settings, and analytic dashboard view configurations. In various embodiments, the configuration settings can be modified via configuration interface 215 via a client such as clients 101, 103, or 105 of FIG. 1. For example, an operator can configure digital workflows, key metric formulas, interested events, and dashboard views of virtual agents via configuration interface 215. In various embodiments, configuration interface 215 is utilized to implement a graphical configuration user interface that allow the configuration steps to be performed with little to no programming experience.

As shown in the example, virtual agent components of cloud service server 201 include virtual agent service 211 and conversation analysis engine 217. In various embodiments, virtual agent service 211 is a server-side component of a virtual agent. Virtual agent service 211 connects with a corresponding client-side component of the virtual agent (not shown) to support an automated digital chat conversation. During the flow of a conversation, virtual agent service 211 tracks the progress of the conversation including the progression states between individual node elements of a digital chat conversation flow design. The tracked data is used by conversation analysis engine 217 to determine conversation analytics. For example, conversation analysis engine 217 can determine the results of key metrics of a digital chat conversation and detect whether an interested event occurred during the conversation. In response to a detected interested event, conversation analysis engine 217 can further determine the corresponding event attributes. The conversation and analytic data from virtual agent service 211 and conversation analysis engine 217 can be stored in database 231.

In some embodiments, analytic data stored in database 231 is transmitted to analytics aggregation engine 221 using payload builder and scheduler 219. For example, conversation data and associated conversation analytic data are extracted and sent as a batched payload to analytics aggregation engine 221. In some embodiments, each payload is prepared and transmitted using data from database 231 by payload builder and scheduler 219. For example, data of a payload is incrementally added as conversations are processed until the payload reaches a predetermined size threshold and/or a time threshold has passed before transmitting the payload to analytics aggregation engine 221. In some embodiments, the elapsed time between payload transmissions is tracked by a scheduler component of payload builder and scheduler 219. Once transmitted, each payload is received and processed by analytics aggregation engine 221. In various embodiments, analytics aggregation engine 221 determines aggregate analytics such as the aggregate values for key metrics and event data across multiple conversations. In some embodiments, the analytics aggregation engine 221 prepares and stores aggregate analytic data in database 231 and provides the prepared analytic data to virtual agent dashboard 213 for viewing.

In various embodiments, an operator can view processed analytic data by accessing virtual agent dashboard 213 via a client such as clients 101, 103, and 105 of FIG. 1. For example, an operator can view key metrics such as the self-solve rate of digital chat conversations. Similarly, an operator can view the number of occurrences of interested events and the attributes associated with the events. In some embodiments, an operator can view a funnel view that shows the conversations that match one or more steps of a sequence of predefined events. At each step, the operator can review the number of conversations that proceeded to the next step. In some embodiments, the operator can drill down from aggregate conversation data to specific conversation data, for example, to examine the actual digital chat conversation associated with a conversation that does not progress between event steps.

Although specific virtual agent components are shown in FIG. 2, fewer or additional components may exist. For example, in some embodiments, conversation analysis engine 217, payload builder and scheduler 219, and analytics aggregation engine 221 are combined and merged into a single functional component. Alternatively, in some embodiments, the virtual agent components are distributed across multiple different cloud service servers. For example, instances of conversation analysis engine 217 and payload builder and scheduler 219 may be hosted on a first cluster of cloud service servers and instances of analytics aggregation engine 221 may be hosted on a second cluster of cloud service servers. As another example, in some embodiments, database 231 is one or more distributed data stores. For example, a first data store can store conversation and conversation analytic data and a second data store can store aggregate analytic data. In various embodiments, FIG. 2 is limited to showing the key components of a virtual agent service and additional components not shown in FIG. 2 also exist.

Figure 3:
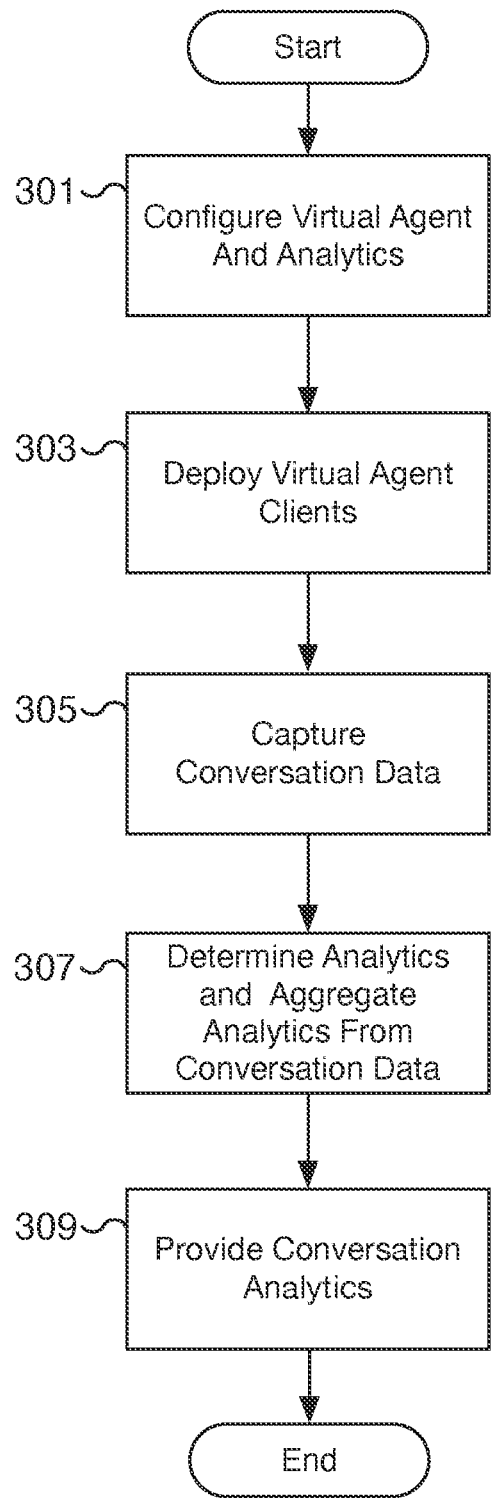
FIG. 3 is a flow chart illustrating an embodiment of a process for providing virtual agent analytics.

FIG. 3 is a flow chart illustrating an embodiment of a process for providing virtual agent analytics. In some embodiments, the process of FIG. 3 can be used to configure and deploy virtual agents configured with automated digital workflows. The digital workflows used by the virtual agents can often address user issues and/or requests without the need for human intervention. Using the process of FIG. 3, virtual agent analytics associated with digital chat conversations guided by digital workflows can be configured, tracked, and retrieved. In some embodiments, the process of FIG. 3 is performed by a cloud service server such as cloud service server 111 of FIG. 1 with the use of a data store such as database 113 of FIG. 1. In some embodiments, the cloud service server performs the process of FIG. 3 using virtual agent components such as the virtual agent components of FIG. 2 including virtual agent service 211, virtual agent dashboard 213, configuration interface 215, conversation analysis engine 217, payload builder and scheduler 219, and analytics aggregation engine 221 of FIG. 2.

At 301, a virtual agent and virtual agent analytics are configured. The configuration can be performed by a user with little to no programming experience. In particular, virtual agent and complex virtual agent analytics including aggregate analytics can be configured with no programming knowledge. For example, an operator configures a virtual agent including the virtual agent's digital workflows. Each digital workflow can include multiple topics corresponding to a user's intent and each topic can include multiple progression states corresponding to individual node elements. In various embodiments, an operator can also configure different virtual agent clients including different virtual agent applications and virtual agent integrations for existing software platforms. At 301, an operator also configures virtual agent analytics. The configured virtual agent analytics can specify which key metrics to track and how they should be tracked. For example, an operator can include customer scripts to override default key metric formulas. Additional virtual agent analytics can include specifying interested events, associated event attributes, aggregate analytics, and different analytic views corresponding to different views accessible by a virtual agent analytics dashboard. Although not shown in FIG. 3, in various embodiments, the virtual agent and virtual agent analytics are server-side configurations and can be reconfigured even after virtual agent clients are deployed at 303 and running. In some embodiments, the configuration is performed by accessing a configuration interface of a cloud service server such as configuration interface 215 of FIG. 2.

At 303, virtual agent clients are deployed. For example, one or more different virtual agents are deployed to client devices such as clients 101, 103, and 105 of FIG. 1. The different virtual agents can include mobile applications, desktop applications, software integrations, and web applications, among others. The deployed virtual agent clients can be used to perform digital chat conversations by communicating with a server-side virtual agent service such as virtual agent service 211 of FIG. 2.

At 305, conversation data is captured. For example, the digital chat conversation between a virtual agent client and the virtual agent service and associated conversation data is captured. In some embodiments, the user's intent is determined from the digital chat conversation and mapped to a digital topic workflow. The user is guided by the virtual agent and progresses through individual node elements of a topic workflow. Along with other conversation data, the user's progression between individual node elements of a digital chat conversation flow design is captured and tracked. In some embodiments, the conversation data is tracked by a server-side virtual agent service such as virtual agent service 211 of FIG. 2 and stored in a database such as database 113 of FIG. 1 and/or database 231 of FIG. 2. In some embodiments, additional conversation data captured can include a profile of the user, the profile of the user's device and virtual agent client, the time of the conversation, and the length of the conversation, among other conversation properties.

At 307, analytics and aggregate analytics are determined from the captured conversation data. For example, the conversation is analyzed to determine analytics data. In various embodiments, the analyzed analytics can include key metrics such as a duration metric, a self-solve metric, and a feedback result metric. In some embodiments, the analyzed analytics include identifying whether an event, such as an interested event configured at 301, occurred during the captured conversation and in response to detecting the occurrence of the event, tracking event attributes. For example, interested events can include the occurrence of a completed interaction, an actionable notification, an automated resolution, a switch to a live agent, and a live user agent message, among others. Each interested event can include trackable attributes specific to the event. For example, a completed interaction can be configured to track the reason for completion, the type of interaction, and whether the virtual agent initiated the chat session. In some embodiments, the conversation data and analytic data are aggregated to determine aggregated analytics. For example, configured analytics can be views across multiple conversations. Aggregated analytics can include displaying the number of occurrences of interested events and aggregated results of event attributes. In some embodiments, the aggregation of data is done at intervals based on the conversation data and/or time thresholds. In some embodiments, analytics data for different analytics views is also processed. For example, in some embodiments, a funnel view data is available to identify the conversations that match one or more steps of a configured funnel sequence. The aggregated conversation data for presenting the funnel view can be processed to determine which conversations match the configured funnel sequence and the number and identity of conversations that progress along each step of the sequence. In some embodiments, analytics for a conversation are processed by a conversation analysis engine such as conversation analysis engine 217 of FIG. 2 and aggregate analytics are processed by an analytics aggregation engine such as analytics aggregation engine 221 of FIG. 2. In some embodiments, the conversation and analytics data is batched and transmitted for aggregation to an analytics aggregation engine by a payload builder and scheduler component such as payload builder and scheduler component 219 of FIG. 2. In various embodiments, the analyzed analytics and aggregate analytics are stored in a data store such as database 113 of FIG. 1 and/or database 231 of FIG. 2.

At 309, conversation analytics are provided. For example, a user can access a graphical user interface dashboard to view the provided analytics including aggregate analytics of a virtual agent. In some embodiments, the dashboard is implemented via a web application, and the virtual agent analytics are provided to a client by a virtual agent dashboard such as virtual agent dashboard 213 of FIG. 2. The dashboard can include different views for displaying different analytics such as key metrics, interested events and their attributes, and/or funnel views of digital chat conversations, among others.

Figure 4:
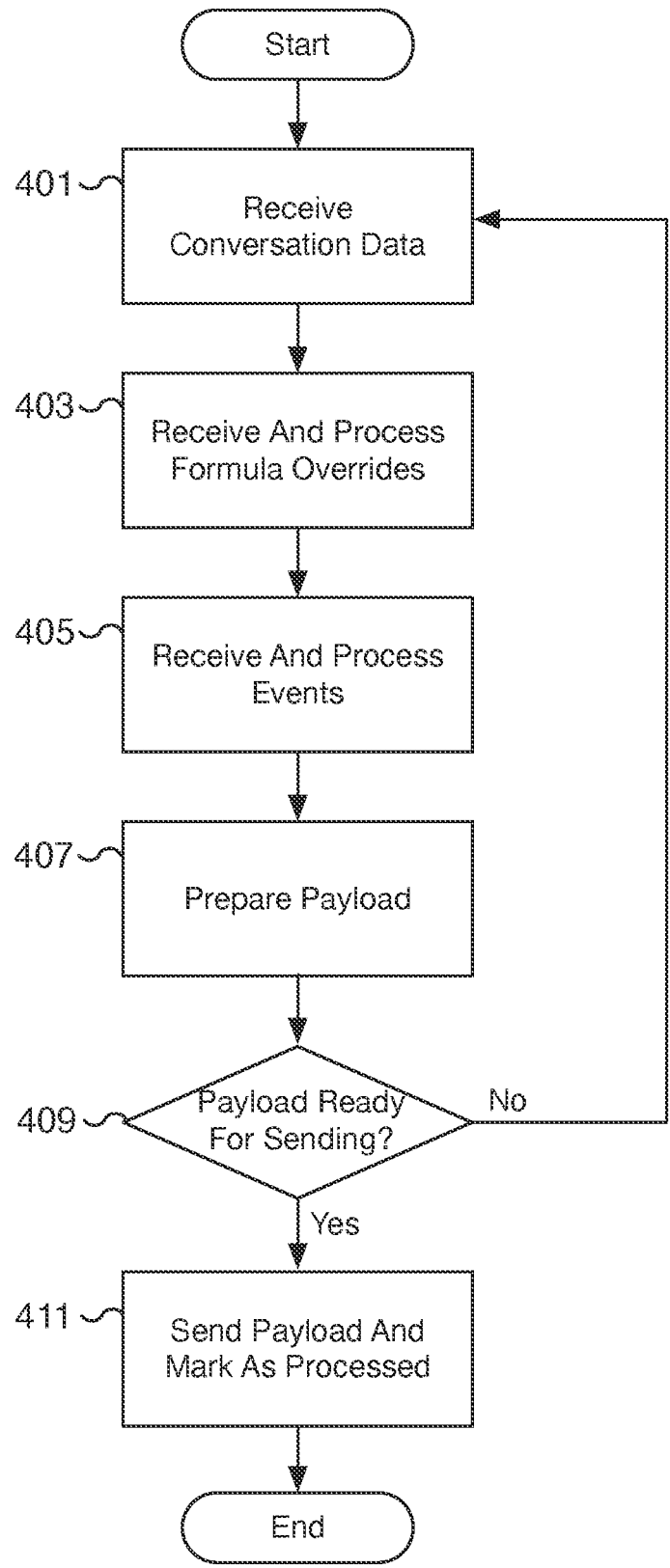
FIG. 4 is a flow chart illustrating an embodiment of a process for determining analytics for a virtual agent conversation.

FIG. 4 is a flow chart illustrating an embodiment of a process for determining analytics for a virtual agent conversation. In some embodiments, the process of FIG. 4 can be used to analyze a digital chat conversation following an automated digital chat conversation flow. The analyzed analytics reveal metrics of the conversation that can be used to track and improve a business process as well as to improve future virtual agent experiences. In some embodiments, the process of FIG. 4 is performed at 307 of FIG. 3 on captured virtual agent conversation data. In some embodiments, the process of FIG. 4 is performed by a cloud service server such as cloud service server 111 of FIG. 1 with the use of a data store such as database 113 of FIG. 1. In some embodiments, the cloud service server performs the process of FIG. 4 using virtual agent components such as conversation analysis engine 217 and payload builder and scheduler 219 of FIG. 2.

At 401, conversation data is received. For example, conversation data is retrieved from a data store, a virtual agent service, or another conversation data source. In various embodiments, the conversation data includes at least data that tracks the digital chat conversation between progression states of individual node elements of a digital chat conversation flow. Additional conversation data can include a profile of the user, the profile of the user's device and virtual agent client, the time of the conversation, and the length of the conversation, among other conversation properties. In various embodiments, the conversation data is received by a conversation analysis engine such as conversation analysis engine 217 of FIG. 2 from a database such as database 231 of FIG. 2.

At 403, formula overrides are received and processed. For example, one or more formula overrides for key metrics are received. The received formula overrides may be updated formula scripts or application plugins for calculating key metrics. In various embodiments, the overrides supersede default formula scripts for calculating key metrics. For example, a default feedback rating may only support three values: good, neutral, and poor. A received formula override can be configured to use a customized formula script and support, as an example, a numeric feedback scale from 0-10. At 403, the updated formula overrides are received, and the available formula scripts are used to process and determine key metrics for the conversation data. In some embodiments, the calculated key metrics are stored in a data store such as database 113 of FIG. 1 and/or database 231 of FIG. 2. In various embodiments, the formula overrides are received and processed using a conversation analysis engine such as conversation analysis engine 217 of FIG. 2.

At 405, events are received and processed. For example, one or more configured interested event specifications are received and used to process the conversation data. The interested event specification can specify an event condition that is used to determine whether the event has occurred. Additionally, an event can specify event attributes that are additional metrics or analytics that are determined based on the detection of an event. For example, interested events can include the occurrence of a completed interaction, an actionable notification, an automated resolution, a switch to a live agent, and a live user agent message, among others. Event attributes for a completed interaction can be configured to track the reason for completion, the type of interaction, and whether the virtual agent initiated the chat session. At 405, the updated event specifications are received and used to process the conversation data to determine which events have occurred and their associated event attributes. In some embodiments, the calculated event data is stored in a data store such as database 113 of FIG. 1 and/or database 231 of FIG. 2. For example, a configured interested event and its determined event data can be mapped to a database table. In some embodiments, the associated event attributes are fields of the specified database table. In various embodiments, the events are received and processed using a conversation analysis engine such as conversation analysis engine 217 of FIG. 2.

At 407, a payload is prepared. For example, conversation analytic data including key metrics determined at 403 and event analytics determined at 405 are prepared and included in a message payload. In some embodiments, the message payload is sized to include the conversation analytic data of multiple digital chat conversations. For example, the payload size can be configured to store the conversation analytic data of a fixed number of conversations, such as up to 100 conversations. As another example, the payload size can be configured to store up to a certain data size such that the number of packaged conversations may differ for each payload depending on how much data is associated with each conversation. In various embodiments, the conversation analytic data packed into a payload includes additional conversation data including conversation metadata to help the receiver decode the payload. In various embodiments, the payload is prepared using a payload builder and scheduler component such as payload builder and scheduler 219 of FIG. 2.

At 409, a determination is made whether the payload is ready for sending. In the event the payload is ready, processing proceeds to 411. For example, a payload may be ready when a payload reaches a predetermined size threshold and/or a time threshold has passed. In the event the payload is not ready, processing proceeds back to 401 where additional conversation data is processed and added to the payload.

At 411, a payload is sent and marked as processed. For example, the payload prepared is sent to aggregated analysis and conversations included in the payload are marked as processed. In some embodiments, the payload is sent to a payload builder and scheduler component such as payload builder and scheduler 219 of FIG. 2 to an analytics aggregation engine such as analytics aggregation engine 221 of FIG. 2.

Figure 5:
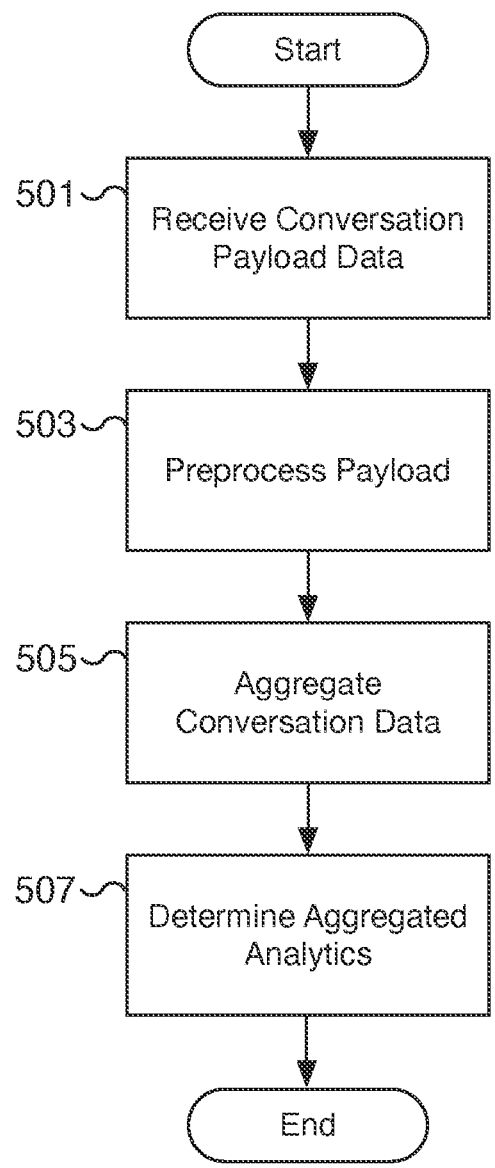
FIG. 5 is a flow chart illustrating an embodiment of a process for determining aggregate analytics for virtual agent conversations.

FIG. 5 is a flow chart illustrating an embodiment of a process for determining aggregate analytics for virtual agent conversations. In some embodiments, the process of FIG. 5 can be used to analyze aggregated digital chat conversation data. The analyzed aggregated analytics can be more helpful than the analyzed analytics associated with an individual conversation, for example, by revealing trends and identifying issues multiple virtual agent sessions have in common.

In some embodiments, the process of FIG. 5 is performed at 307 of FIG. 3 on conversation analytics data. In some embodiments, the process of FIG. 5 is performed by a cloud service server such as cloud service server 111 of FIG. 1 with the use of a data store such as database 113 of FIG. 1. In some embodiments, the cloud service server performs the process of FIG. 5 using virtual agent components such as analytics aggregation engine 221 of FIG. 2.

At 501, conversation payload data is received. For example, conversation payload data can be received that includes batched conversation and analytics data corresponding to multiple conversations. In various embodiments, the payload received is the one sent at 411 of FIG. 4.

At 503, payload data is preprocessed. For example, the data is preprocessed to identify the relevant analytic data. In some embodiments, the headers and/or metadata is analyzed to identify relevant analytic data for additional processing. For example, only interested aggregated events may be relevant for a particular virtual agent. In some embodiments, the data is transformed and loaded into one or more database tables of an aggregate analytics database as part of the preprocessing. In some embodiments, the aggregate analytics database is database 231 of FIG. 2.

At 505, conversation data is aggregated. For example, the conversation data including the analytics data is aggregated. In some embodiments, the aggregated analytics include aggregating key metrics as well as event data such as the occurrences of interested events and their associated event attributes. In various embodiments, the aggregation process can include transformation steps to transform the data from one or more initial data formats to an aggregate data format more easily accessible via an aggregated analytics application programming interface (API) and/or virtual agent analytics dashboard.

At 507, aggregated analytics are determined. For example, aggregate analytics are determined using the aggregated conversation data. In some embodiments, the aggregate analytics require preparing different aggregated analytics for different aggregated analytic views. For example, multiple funnel views can be defined that each depict how conversations progress through a different defined sequence of steps, such as a sequence of events. At each step, only a portion of the aggregated digital chat conversations may progress to the next step. At 507, the conversation data that matches different configured funnel views is determined. Relationship data linking each funnel step to the individual conversations of the step may also be determined and prepared. The relationship data allows the user of a funnel view to drill down to specific conversations to determine which conversations reached a specific step and why. As another example, aggregate event views can be determined at 507. For example, data for an aggregated event view is determined to allow a user to view the event data across multiple conversations. In various embodiments, once the aggregated analytics are determined, the results can be provided to a user, for example, via a virtual agent analytics dashboard. In some embodiments, the virtual agent analytics dashboard interfaces with an analytics aggregation engine via an aggregated analytics application programming interface (API). For example, the determined aggregated analytics may be stored in one or more database tables of an aggregate analytics database and made accessible via the aggregated analytics API. In some embodiments, the aggregate analytics database is database 231 of FIG. 2.

Figure 6:
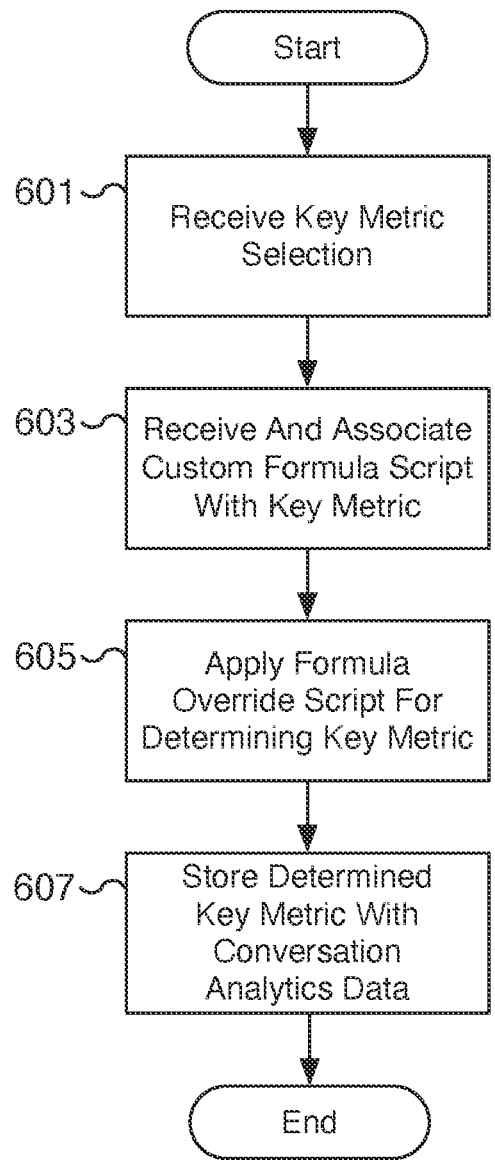
FIG. 6 is a flow chart illustrating an embodiment of a process for configuring and applying a formula override for a virtual agent key metric.

FIG. 6 is a flow chart illustrating an embodiment of a process for configuring and applying a formula override for a virtual agent key metric. In some embodiments, the process of FIG. 6 can be used to override and/or configure a default key metric formula and can be performed with little to no programming experience using a graphical configuration user interface. Once configured, the key metric formula is applied to conversation data to determine a key metric value associated with a digital chat conversation. In some embodiments, the steps 601 and/or 603 are performed at 301 of FIG. 3 to configure the formula override and/or the steps 605 and/or 607 are performed at 307 of FIG. 3 and/or 403 of FIG. 4 to apply the configured formula on conversation data to determine and store a key metric. In some embodiments, the process of FIG. 6 is performed by a cloud service server such as cloud service server 111 of FIG. 1 with the use of a data store such as database 113 of FIG. 1. In some embodiments, the cloud service server performs the process of FIG. 6 using virtual agent components such as configuration interface 215 and conversation analysis engine 217 of FIG. 2.

At 601, a key metric selection is received. For example, using a configuration interface, a key metric is selected by an operator. Example key metrics of a digital chat conversation can include a duration metric, a self-solve metric, and a feedback result metric, among others. In some embodiments, a list of default and/or previously configured key metrics is provided, and new key metrics may be added. In some embodiments, a key metric is associated with a field in a database table and can be implemented by a default formula, such as a default formula script.

At 603, a custom formula script is received and associated with the key metric. For example, using a configuration interface, a custom formula script is received and configured for use in calculating the key metric for digital chat conversations. The received custom formula script can replace a previously configured script, such as a default or another custom script. In some embodiments, the script can reference conversation data including conversation analytics data. For example, a custom formula script can replace the default implementation for determining a feedback result metric. As a first example, a new custom formula script can take a feedback numeric score provided by the user and map it to a number rating from 0-10. As another example, a new custom formula script can take written feedback provided by the user, infer a numeric score from the written feedback, and scale the score to a numeric rating between 1 and 3.

At 605, the formula override script is applied for determining the key metric. For example, the formula override script is provided to a conversation analysis engine to implement a key metric and/or to override an existing formula script. In some embodiments, the conversation analysis engine receives the formula override script and applies it to determine a key metric on new conversations. For example, a new conversation can conclude with the virtual agent receiving a feedback score from the user. Using the formula override script, the conversation analysis engine can apply the script to transform the user provided feedback score into a more desirable format. For example, a formula override script can convert written feedback in the form of the words "good," "neutral," and "bad" to a numeric rating between 1 and 3.

At 607, the determined key metric is stored with conversation analytics data. For example, the determined key metric is stored in a datastore along with additional conversation analytics data. In some embodiments, the data store is database 231 of FIG. 2. In various embodiments, the determined key metric is one of many analyzed analytic results stored in the data store along with other conversation data and conversation analytics data.

Figure 7:
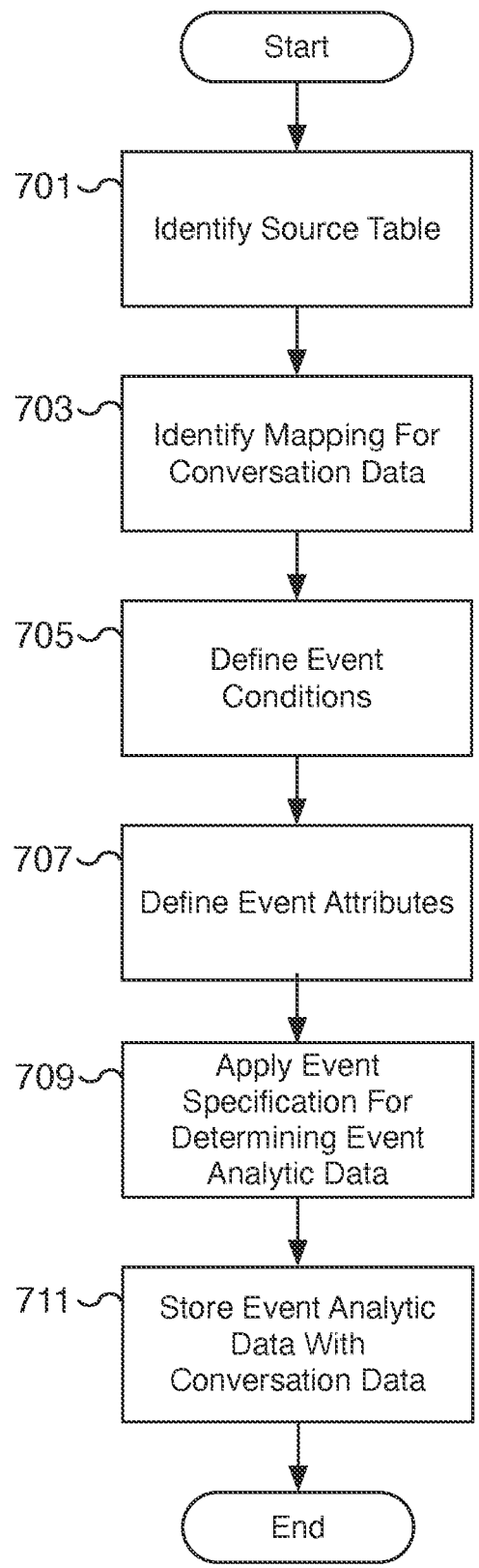
FIG. 7 is a flow chart illustrating an embodiment of a process for configuring an interested event for a virtual agent digital chat conversation.

FIG. 7 is a flow chart illustrating an embodiment of a process for configuring an interested event for a virtual agent digital chat conversation. In various embodiments, the configuration can be performed with little to no programming experience using a graphical configuration user interface. Once the interest event is configured, occurrences of the interested event and event attributes can be tracked in conversations. In some embodiments, the event data is tracked and stored and then made available via an analytics dashboard. In some embodiments, the event data is aggregated to show aggregate event analytics. In some embodiments, the steps 701, 703, 705, and/or 707 are performed at 301 of FIG. 3 to configure the interested event and/or the steps 709 and/or 711 are performed at 307 of FIG. 3 and/or 405 of FIG. 4 to detect an interested event in conversation data and to determine event attributes. In some embodiments, the process of FIG. 7 is performed by a cloud service server such as cloud service server 111 of FIG. 1 with the use of a data store such as database 113 of FIG. 1. In some embodiments, the cloud service server performs the process of FIG. 7 using virtual agent components such as configuration interface 215 and conversation analysis engine 217 of FIG. 2.

At 701, a source database table is identified. For example, available databases and associated tables that are compatible with events are presented as options and an operator selects one of the tables as the source database table. The source table identified is used for configuring an interested event. In some embodiments, the identified source table stores data from tracking digital chat conversations and their conversation workflows. For example, a source interaction table can include multiple fields including a State field used to track the progress of an interaction.

At 703, mapping for conversation data is identified. For example, a conversation mapping field is identified and used to map conversations with source data from the source database table identified at 701. In various embodiments, specifying a conversation data mapping allows the event analytics to be performed on digital chat conversations captured via virtual agents.

At 705, an event is defined. For example, an event name and event properties including event conditions are defined. In some embodiments, the event conditions are one or more conditions used to determine whether an event has occurred. The event condition can be based on fields of the source database table. For example, an interaction table used to configure a completed interactions event can include multiple fields including a State field used to track the progress of an interaction. An event condition can be defined that corresponds to the State field having the value Closed Complete. In some embodiments, complex Boolean conditions can be configured for the event condition, for example, by utilizing multiple and/or nested Boolean operations. At 705, additional event properties can be configured such as an active flag to enable or disable processing for the interested event, post event filters, and an event scoping limits.

At 707, event attributes are defined. For example, event attributes are specified for determining analytics specific to the event. In some embodiments, the attributes are based on the source database table identified at 701. For example, an interaction table used to configure a completed interactions event can include fields: state_reason, type, and virtual_agent. Any of the fields can be specified as an active event attribute to track conversation analytics associated with the active field. In the above example, the state_reason field can be used to track the reason for the interaction, the type field can be used to track the type of interaction, and the virtual_agent field can be used to track whether a virtual agent initiated the chat. In some embodiments, custom scripts are received and used instead for determining the event attribute values. For example, an advanced event attribute can utilize a custom script to modify a field of the source table to customize the analysis for the event attribute.

At 709, an event specification is applied to determine event analytic data. For example, the event defined at steps 701, 703, 705, and 707 is used to create an event specification that is applied at 709 on a digital chat conversation and associated conversation data. In various embodiments, the event condition is used to determine whether the interested event occurred during a conversation. If the interested event is detected, the event attributes are also determined. In various embodiments, the determined event data is event analytic data that can be later aggregated and presented via a virtual agent dash. Using the above example, a completed interaction event can be identified and matched to a conversation in the event the conversation data matches the configured event condition. If the condition is met, analytic data of the event attributes corresponding to the reason for the interaction, the type of interaction, and whether a virtual agent initiated the chat is determined and tracked.

At 711, event analytic data is stored with conversation analytics data. For example, the event analytic data determined and tracked at 709 is stored in a datastore along with additional conversation analytics data. In some embodiments, the data store is database 231 of FIG. 2. In various embodiments, the determined event analytic data is a subset of analyzed analytic results stored in the data store along with other conversation data and conversation analytics data.

Figure 8:
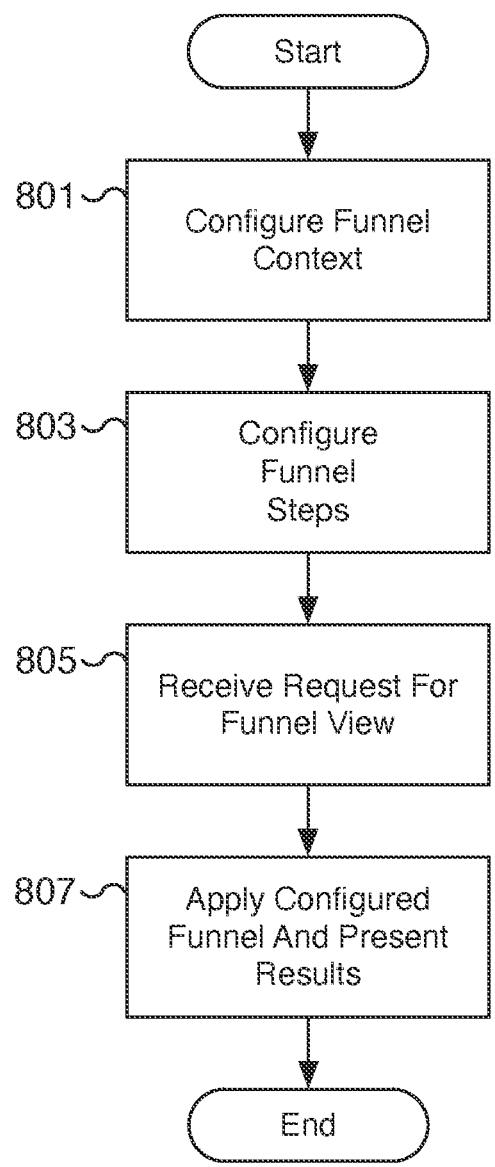
FIG. 8 is a flow chart illustrating an embodiment of a process for configuring a funnel view for analyzing virtual agent conversations.

FIG. 8 is a flow chart illustrating an embodiment of a process for configuring a funnel view for analyzing virtual agent conversations. In some embodiments, the process of FIG. 8 is utilized to configure and apply a funnel analytics view for viewing aggregate analytics for digital chat conversations. In various embodiments, the configuration can be performed with little to no programming experience using a graphical configuration user interface. A funnel view can be configured to identify conversations with events that match a certain sequence of steps. As the sequence of met steps lengthens, fewer and fewer conversations may meet the requirements of the latest step. At each step, an operator is shown the number of and which conversations match the step conditions. Using a funnel view, an operator can identify which steps in the conversation flow are associated with drops and quantify the impact of those drops. In some embodiments, the steps 801, and/or 803 are performed at 301 of FIG. 3 to configure a funnel view and/or the steps 805 and/or 807 are performed at 307 and/or 309 of FIG. 3 and/or 507 of FIG. 5 to determine aggregated analytics required for a funnel view and to present the funnel view. In some embodiments, the process of FIG. 8 is performed by a cloud service server such as cloud service server 111 of FIG. 1 with the use of a data store such as database 113 of FIG. 1. In some embodiments, the cloud service server performs the process of FIG. 8 using virtual agent components such as configuration interface 215, analytics aggregation engine 221, and virtual agent dashboard 213 of FIG. 2.

At 801, a funnel context is configured. For example, using a configuration interface, the context for a funnel view is configured. The context can specify the range of chat conversations to consider for the funnel, for example, by specifying a time range such as the last month of conversations or another limitation on the set of conversations such as conversations associated with a certain number or type of deployed virtual agents.

At 803, funnel steps are configured. For example, the steps of the funnel are specified. In various embodiments, each step can specify a node element visited in a digital chat conversation flow, the occurrence of an event such as a configured interested event, or another conversation step such as the start of a conversation. In some embodiments, other funnel steps may be appropriate as well. In various embodiments, the configured steps are a sequence of linear steps that a conversation will be filtered through. Conversations that match the first step will be considered for subsequent steps of the funnel. For example, an example funnel can be configured with five steps. The first step is the start of any conversation, the second step is the triggering of a "Virtual Agent Conversations" event, the third step is the triggering of a "Channel—Web Client" event, the fourth step is the triggering of a "Completed Conversations" event, and the fifth and final step is the triggering of a "User Ended" event. The example funnel initially captures any conversation and then progressively filters out conversations that no longer meet the additional steps. At step two, only virtual agent conversations are retained. At step three, only virtual agent conversations that utilize a web client are retained. At step four, only virtual agent conversations that utilize a web client and complete the conversation are retained. Finally, at step five, only virtual agent conversations that utilize a web client, complete the conversation, and the user ends the conversation are retained.

At 805, a request for a funnel view is received. For example, a user requests a funnel view from a virtual agent dashboard. In some embodiments, the dashboard presents all configured funnels and a user selects the interested funnel to initiate a request for a funnel view. In some embodiments, the request is received via a virtual agent analytics dashboard such as virtual agent dashboard 213 of FIG. 2.

At 807, the configured funnel is applied and the funnel view results are provided. In some embodiments, the funnel is applied by first determining aggregate analytics using aggregated conversation data. For example, a configured funnel may require aggregate event analytics to match funnel steps based on a triggered event. In various embodiments, the conversations associated with the aggregate conversation data that matches the first step of the configured funnel are determined. For subsequent steps, only the matching conversations from the previous step are considered. At each step, relationship data linking each funnel step to the individual conversations of the step can be determined and prepared. The relationship data allows the user of a funnel view to drill down to specific conversations to determine which conversations reached a specific step and why. In various embodiments, analytics such as the percentage of retained conversations at each step, the average time associated with each step, and/or the number of users associated with each step, among other analytic data are calculated and displayed to the user. In various embodiments, the user can interact with the graphical user interface of the funnel view to drill down and reveal additional information associated with each step.

Figure 9:
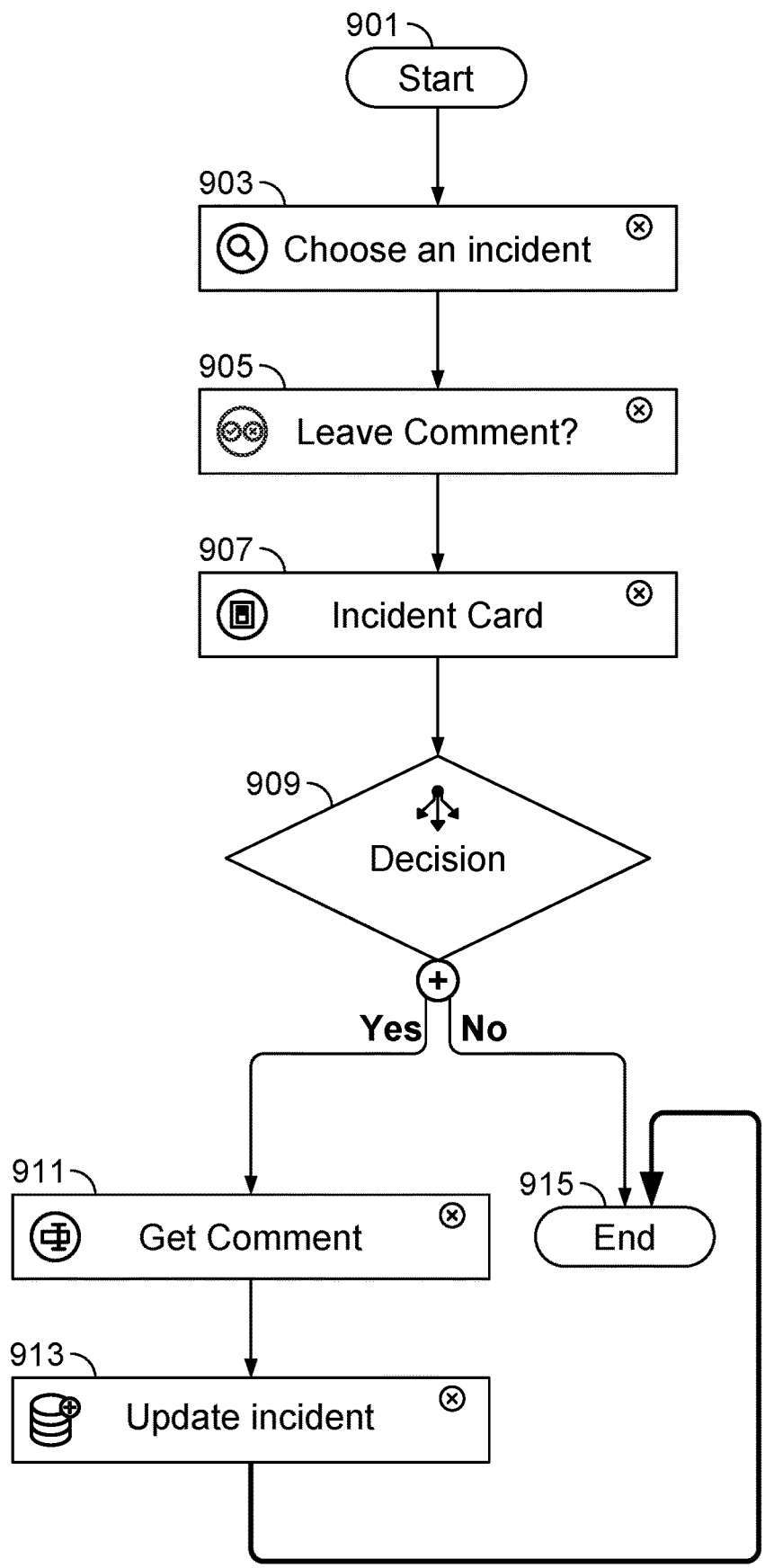
FIG. 9 is a diagram illustrating an embodiment of a digital chat conversation flow for a virtual agent.

FIG. 9 is a diagram illustrating an embodiment of a digital chat conversation flow for a virtual agent. In the example shown, the digital chat conversation flow corresponds to a single topic and includes multiple node elements 901, 903, 905, 907, 909, 911, 913, and 915. In some embodiments, a digital workflow for a virtual agent can cover multiple topics and the active topic is based on an intent inferred from the user's response. In the example shown, the digital chat conversation flow corresponds to a sequence of steps, represented as element nodes, that allow a user to add a comment on a reported incident. Node 901 is a start node and 915 is an end node. The nodes 903, 905, 907, 909, 911, and 913 are different flow element nodes. For example, node 903 is a reference choice node that allows the user to select an incident, such as an incident that the user has previously submitted. Node 905 is a Boolean control node that allows the user the specify whether the user would like to leave a comment for the selected incident. Node 907 is a bot response node that displays the selected incident to the user via the virtual agent. Node 909 is a decision node that controls the flow of the conversation. In the event the user does not want to leave a comment, the conversation flow proceeds to node 915, where the topic ends. Alternatively, in the event the user wants to leave a comment, the conversation flow proceeds to node 911. Node 911 is a text node that allows the user to leave a text comment via the virtual agent and node 913 is an action utility node that stores the user provided comment.

In various embodiments, as a user progresses through the different element nodes of a topic, the progression states are tracked and stored as conversation data. In some embodiments, the digital chat conversation flow can be configured at 301 of FIG. 3. The corresponding conversation data from applying the configured workflow using a virtual agent is tracked and stored at 305 of FIG. 3. By analyzing the tracked conversation data, analytics including aggregate analytics can be determined and provided to an operator via a virtual agent dashboard. In some embodiments, the corresponding analytics are determined at 307 of FIG. 3 and/or using the processes of FIGS. 4 and/or 5.

FIG. 10 is a diagram illustrating an embodiment of a user interface for configuring an interested event for a virtual agent digital chat conversation. In the example shown, event configuration user interface 1000 is an example embodiment of a user interface for configuring interested events. In some embodiments, event configuration user interface 1000 is displayed by a configuration interface component of a cloud service server. The user interface allows an operator to configure an event that can be used for analyzing event analytics of digital chat conversations. In some embodiments, event configuration user interface 1000 is utilized at 301 of FIG. 3 and/or at 701, 703, 705, and/or 707 of FIG. 7 by accessing a cloud service server such as cloud service server 111 of FIG. 1 and/or cloud service server 201 of FIG. 2 using a configuration interface component such as configuration interface 215 of FIG. 2. In some embodiments, the configuration settings for the configured event are stored in a data store such as database 113 of FIG. 1 and/or database 231 of FIG. 2. Once an event is configured and activated, conversation data can be analyzed to identify corresponding events and determine their associated event attributes.

In the example shown, event configuration user interface 1000 includes user interface components for specifying configuration settings for an interested event. The top portion of event configuration user interface 1000 includes configuration settings for naming the interested event, activating the event, setting a source table, setting an event condition or source table filter, and setting a conversation mapping field, among others. In the example shown, the event is named Completed Interactions, the event is activated, an interaction database table is selected as the source table, and the conversation mapping field is set to Channel Metadata Record. The configured event condition of the source table filter is set to filter on the condition that the State field has the value Closed Complete.

In the example shown, the lower portion of event configuration user interface 1000 includes configuration settings for event attributes. The three event attributes that are configured are named Reason, Type of Interaction, and Virtual Agent Initiated Chat. The attributes correspond to fields of the configured interactions table and are the fields state_reason, type, and virtual_agent, respectively. In some embodiments, an advanced event attribute is configured by providing a value script.

Figure 11:
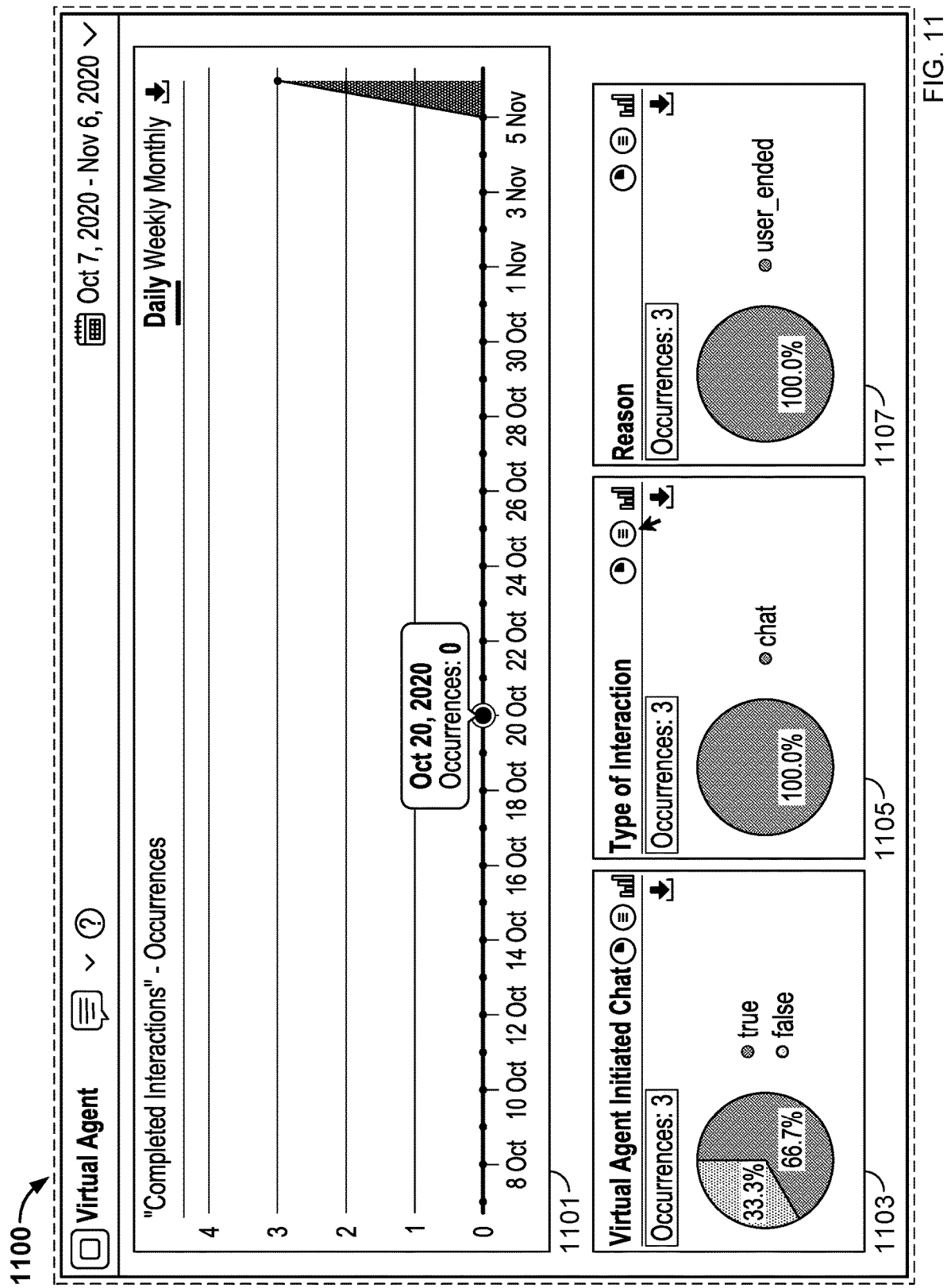
FIG. 11 is a diagram illustrating an embodiment of a user interface for viewing aggregated analytics of an interested event for a virtual agent.

FIG. 11 is a diagram illustrating an embodiment of a user interface for viewing aggregated analytics of an interested event for a virtual agent. In various embodiments, event user interface dashboard 1100 allows an operator to view the occurrences of an interested event and specific attributes associated with the event. In the example shown, event user interface dashboard 1100 is an example embodiment of a user interface for viewing digital chat conversations analyzed for the configured interested event of FIG. 10 and the analytics data for the Completed Interactions events displayed in event user interface dashboard 1100 corresponds to the event being configured using event configuration user interface 1000 in FIG. 10. In some embodiments, data associated with event user interface dashboard 1100 is provided by a virtual agent dashboard such as virtual agent dashboard 213 of FIG. 2. Operators can access the event analytics dashboard via a cloud service server such as cloud service server 111 of FIG. 1 and/or cloud service server 201 of FIG. 2. In some embodiments, support and/or data for event user interface dashboard 1100 is provided at 309 of FIG. 3.

In the diagram of FIG. 11, event user interface dashboard 1100 includes event user interface component 1101 and event attribute user interface components 1103, 1105, and 1107. Event user interface component 1101 displays the number of occurrences of the configured interested event in the analyzed conversation data over time. In various embodiments, the time scale can be modified, for example, to show the occurrence of events on a daily, weekly, or monthly scale. Below event user interface component 1101 are three event attribute user interface components corresponding to three configured event attributes for a completed interactions event. Event attribute user interface component 1103 displays Virtual Agent Initiated Chat analytic data, event attribute user interface component 1105 displays Type of Interaction analytic data, and event attribute user interface component 1107 displays Reason analytic data. Each of event attribute user interface components 1103, 1105, and 1107 display their corresponding aggregated analytic data using pie chart diagrams but can be configured to display their respective aggregate analytics data using other display formats or representations, such as trend lines and in chart form.

Figure 12:
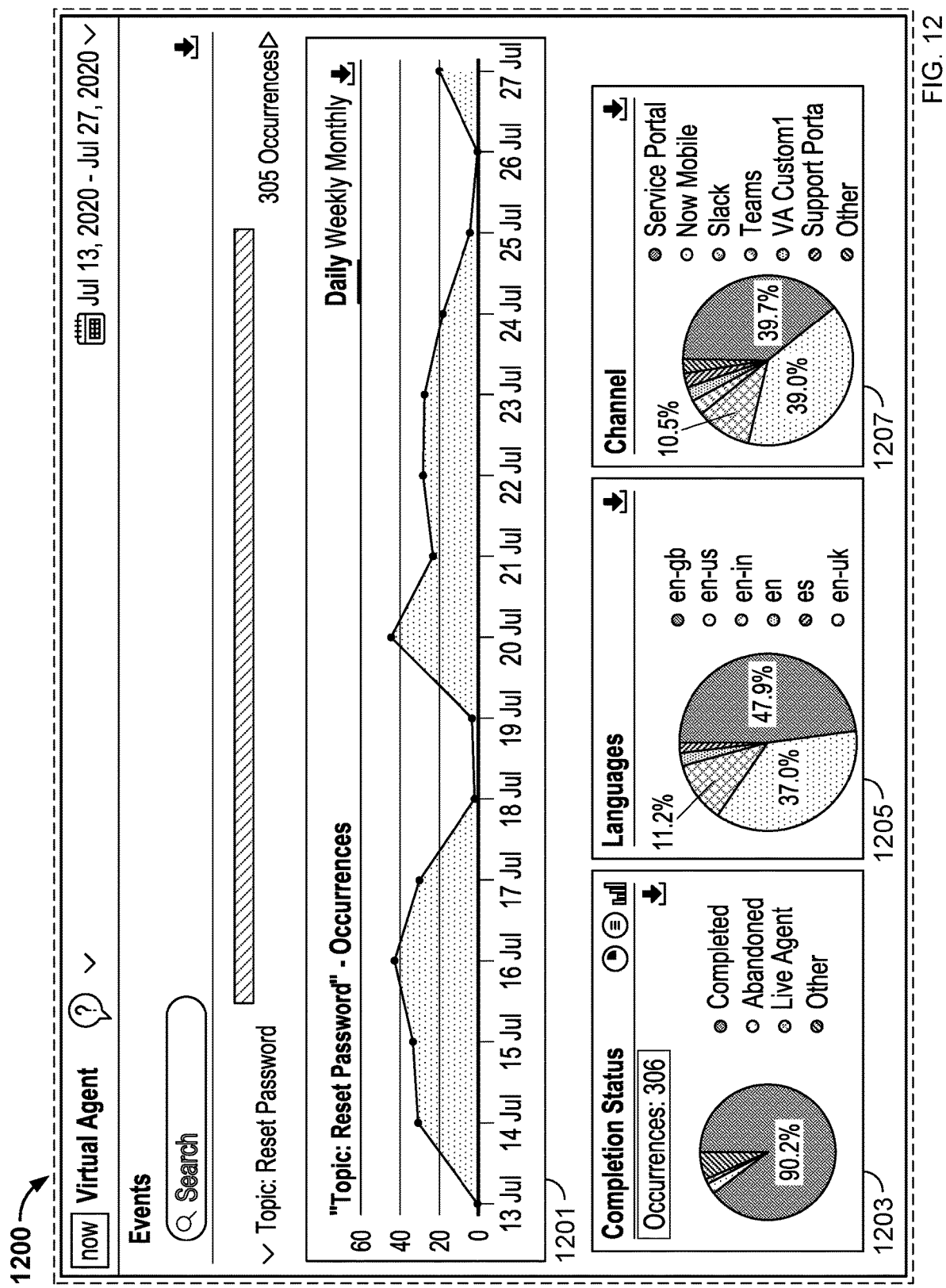
FIG. 12 is a diagram illustrating an embodiment of a user interface for viewing aggregated analytics of an interested event for a virtual agent.

FIG. 12 is a diagram illustrating an embodiment of a user interface for viewing aggregated analytics of an interested event for a virtual agent. Similar to event user interface dashboard 1100 of FIG. 11, event user interface dashboard 1200 is an additional example and another embodiment of a user interface for viewing an interested event and specific attributes associated with the event. In the example shown, event user interface dashboard 1200 is an example embodiment of a user interface for viewing digital chat conversations analyzed for a Topic: Reset Password event. As with event user interface dashboard 1100 of FIG. 11, the data associated with event user interface dashboard 1200 can be provided by a virtual agent dashboard such as virtual agent dashboard 213 of FIG. 2 and operators can access the event analytics dashboard via a cloud service server such as cloud service server 111 of FIG. 1 and/or cloud service server 201 of FIG. 2. In some embodiments, support and/or data for event user interface dashboard 1200 is provided at 309 of FIG. 3.

In the diagram of FIG. 12, event user interface dashboard 1200 includes event user interface component 1201 and event attribute user interface components 1203, 1205, and 1207. Event user interface component 1201 displays the number of occurrences of the configured interested event corresponding to a password reset in the analyzed conversation data over time. In various embodiments, the time scale can be modified, for example, to show the occurrence of events on a daily, weekly, or monthly scale. Below event user interface component 1201 are three event attribute user interface components corresponding to three configured event attributes for the password reset event. Event attribute user interface component 1203 displays Completion Status analytic data, event attribute user interface component 1205 displays Languages analytic data, and event attribute user interface component 1207 displays Channel analytic data. Each of event attribute user interface components 1203, 1205, and 1207 display their corresponding aggregated analytic data using pie chart diagrams but can be configured to display their respective aggregate analytics data using other display formats or representations, such as trend lines and in chart form.

Figure 13:
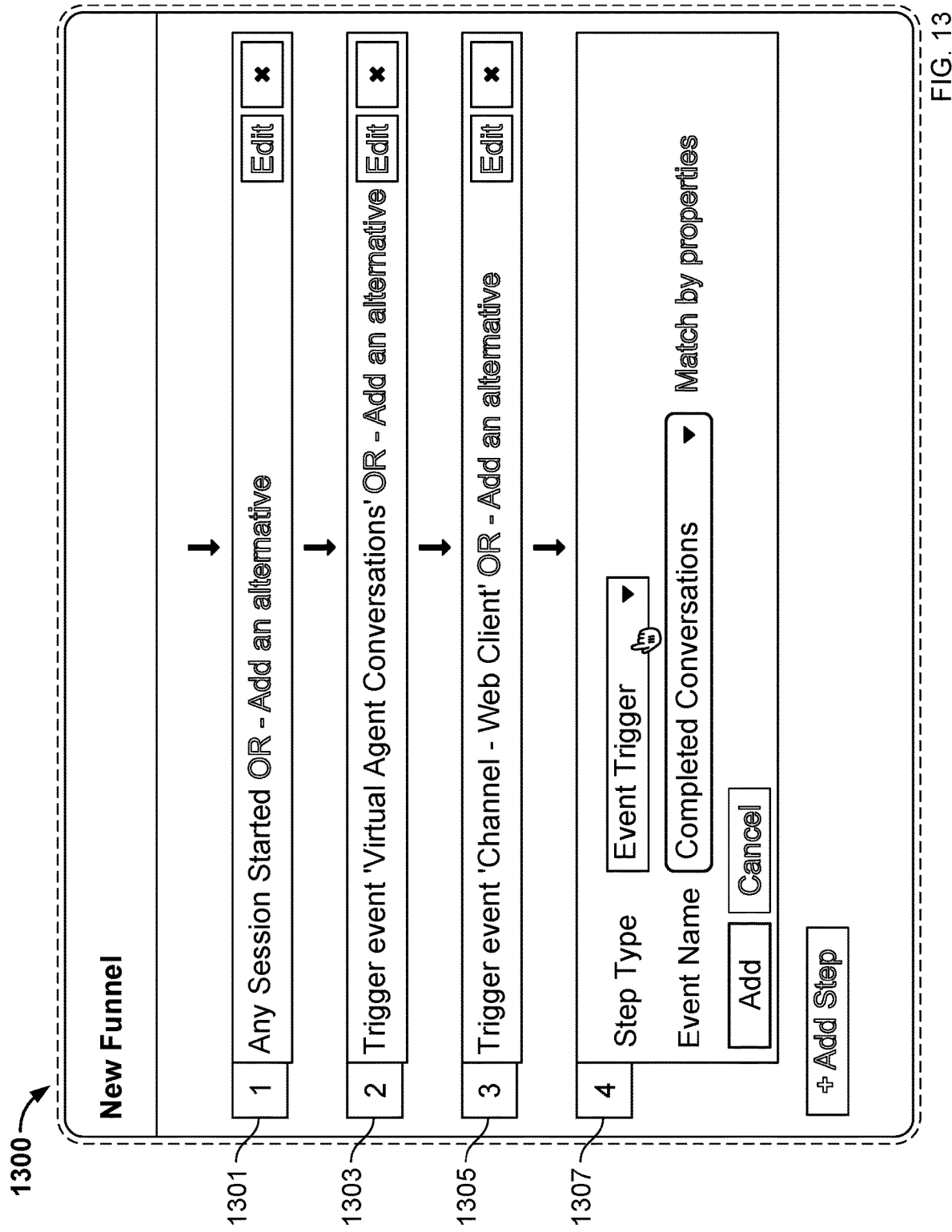
FIG. 13 is a diagram illustrating an embodiment of a user interface for configuring a funnel for virtual agent digital chat conversations.

FIG. 13 is a diagram illustrating an embodiment of a user interface for configuring a funnel for virtual agent digital conversations. In the example shown, funnel configuration user interface 1300 is an example embodiment of a user interface for configuring a virtual agent digital conversation funnel. In some embodiments, funnel configuration user interface 1300 is displayed by a configuration interface component of a cloud service server. The user interface allows an operator to configure a funnel that can be used for analyzing aggregated analytics of digital chat conversations. In some embodiments, funnel configuration user interface 1300 is utilized at 301 of FIG. 3 and/or at 801 and/or 803 of FIG. 8 by accessing a cloud service server such as cloud service server 111 of FIG. 1 and/or cloud service server 201 of FIG. 2 using a configuration interface component such as configuration interface 215 of FIG. 2. In some embodiments, the configuration settings for the configured funnel are stored in a data store such as database 113 of FIG. 1 and/or database 231 of FIG. 2. Once a funnel is configured and activated, conversation data including aggregate analytic data can be analyzed to identify matching conversations that meet one or more steps of the funnel sequence.

In the example shown, funnel configuration user interface 1300 displays the first four configured steps of a new funnel, funnel steps 1301, 1303, 1305, and 1307. Funnel step 1301 is configured to match the start of any digital chat conversation session. Funnel step 1303 is configured to match the triggering of a Virtual Agent Conversations event. Funnel step 1305 is configured to match the triggering of a Channel—Web Client event. And funnel step 1307 is configured to match the triggering of a Completed Conversations event. The first step (configured as funnel step 1301) corresponds to the start of any conversation, the second step (configured as funnel step 1303) corresponds to the triggering of a "Virtual Agent Conversations" event, the third step (configured as funnel step 1305) corresponds to the triggering of a "Channel—Web Client" event, and the fourth step (configured as funnel step 1307) corresponds to the triggering of a "Completed Conversations" event. The example funnel shown in funnel configuration user interface 1300 initially captures any conversation and then progressively filters out conversations that no longer meet the additional steps. At step two, only virtual agent conversations are retained. At step three, only virtual agent conversations that utilize a web client are retained. At step four, only virtual agent conversations that utilize a web client and complete the conversation are retained. In some embodiments, a final fifth step as shown in FIG. 14 is configured to match only an event conditioned on the user ending the conversation.

Figure 14:
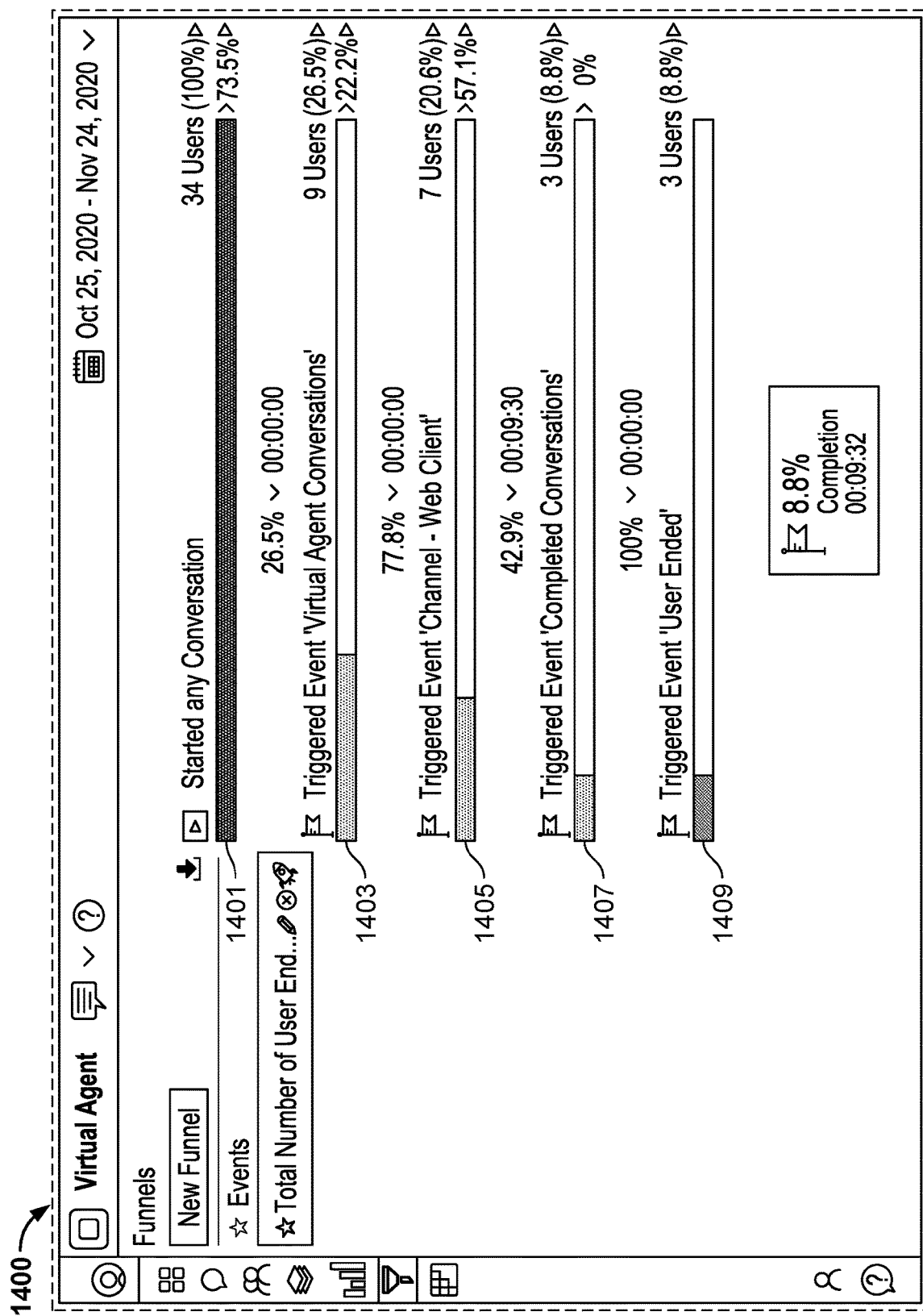
FIG. 14 is a diagram illustrating an embodiment of a user interface displaying a funnel view of virtual agent digital chat conversations.

FIG. 14 is a diagram illustrating an embodiment of a user interface displaying a funnel view of virtual agent digital chat conversations. In various embodiments, funnels user interface dashboard 1400 allows an operator to view digital chat conversations using a configured funnel view. In the example shown, funnels user interface dashboard 1400 is an example embodiment of a user interface for viewing digital chat conversations analyzed for the funnel being configured in FIG. 13 with a fifth and final step User Ended event added. In some embodiments, data associated with funnels user interface dashboard 1400 is provided by a virtual agent dashboard such as virtual agent dashboard 213 of FIG. 2. Operators can access funnels user interface dashboard 1400 via a cloud service server such as cloud service server 111 of FIG. 1 and/or cloud service server 201 of FIG. 2. In some embodiments, support and/or data for funnels user interface dashboard 1400 is provided at 309 of FIG. 3.

In the diagram of FIG. 14, funnels user interface dashboard 1400 displays the steps of the selected configured funnel and associated aggregated funnel analytic data. The displayed funnel view includes five steps, each step corresponding to a funnel step user interface component. Funnels user interface dashboard 1400 includes funnel step user interface component 1401, 1403, 1405, 1407, and 1409 corresponding to steps one through five, respectively, of the selected configured funnel. Funnel step user interface component 1401 displays aggregate analytics corresponding to the first step of the funnel, the start of any conversation. As shown, step one starts with 34 users and 26.5% of the users proceed to step two while 73.5% of the users do not. Funnel step user interface component 1403 displays aggregate analytics corresponding to the second step of the funnel, the triggering of a Virtual Agent Conversations event. As shown, step two includes 9 users or 26.5% of the total initial users. From step two, 77.8% of the users proceed to step three while 22.2% of the users do not. Funnel step user interface component 1405 displays aggregate analytics corresponding to the third step of the funnel, the triggering of a Channel—Web Client event. As shown, step three includes 7 users or 20.6% of the total initial users. From step three, 42.9% of the users proceed to step four while 57.1% of the users do not. Funnel step user interface component 1407 displays aggregate analytics corresponding to the fourth step of the funnel, the triggering of a Completed Conversations event. As shown, step four includes 3 users or 8.8% of the total initial users. From step four, 100% of the users proceed to the final fifth step. Funnel step user interface component 1409 displays aggregate analytics corresponding to the fifth and final step of the funnel, the triggering of a User Ended event. As shown, step five includes 3 users or 8.8% of the total initial users.

As also shown in the example, at each funnel step, additional analytic data associated with the funnel step can be displayed. For example, each step also displays an associated time such as the average time spent between steps. Using steps three and four of the funnel view as an example, the time between steps three and four is shown as 00:09:30 indicating that on average a conversation lasts over nine minutes from triggering the Channel—Web Client event to reaching a Completed Conversations event.

In various embodiments, a user can drill down to reveal additional analytic data on funnel steps including conversation data such as individual digital chat conversations. For example, in some embodiments, a user can select the triangle icons on the right side of each funnel step user interface component to either drill down to the users/conversations that match the associated step conditions or to drill down to the users/conversations that did not match the conditions required to proceed to the next step.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    tracking and storing analytic data about digital chat conversations taking place within a digital workflow environment, wherein the analytic data tracks conversation progression states between individual node elements of at least one digital chat conversation flow design;
    receiving a specification of an interested event for the analytic data;
    extracting data associated with the interested event;
    providing the extracted data for analysis;
    providing a graphical user interface platform for managing monitoring and analysis of the digital chat conversations associated with one or more virtual agents; and
    implementing a digital specification of a funnel view that defines a linear sequence of condition steps for analyzing the digital chat conversations;
    automatically performing the analysis of the extracted data including by using a computer processor to determine for each corresponding condition step of a plurality of condition steps included in the linear sequence of condition steps of the funnel view, a corresponding aggregated result of a corresponding subset of the digital chat conversations further meeting the corresponding condition step within a progression of the linear sequence of condition steps of the funnel view that is different from the digital chat conversation flow design; and
    automatically providing, via the graphical user interface platform, interactive elements with the corresponding aggregated results of the funnel view for improving an automated response or the digital chat conversation flow design of at least one of the one or more virtual agents.

2. The method of claim 1, wherein the specification of the interested event for the analytic data includes identifiers of a source table, a conversation mapping field, and an interested event condition different from the linear sequence of condition steps.

3. The method of claim 2, wherein the interested event condition is specified as a Boolean condition and references one or more fields of the specified source table.

4. The method of claim 2, wherein the specification of the interested event for the analytic data includes an identifier of an event attribute to track, wherein the event attribute is specified by referencing one or more fields of the specified source table.

5. The method of claim 1, wherein tracking and storing the analytic data about the digital chat conversations taking place within the digital workflow environment includes applying a script on the analytic data to determine analytic metrics of the digital chat conversations taking place within the digital workflow environment.

6. The method of claim 5, further comprising:
receiving a specification associated with the script, wherein the received specification associated with the script includes a custom formula script and specifies a database field for tracking the analytic data about the digital chat conversations taking place within the digital workflow environment; and
replacing a default formula script with the custom formula script.

7. The method of claim 1, further comprising:
presenting the aggregated result for display via the graphical user interface platform.

8. The method of claim 1, wherein determining the corresponding aggregated result includes:
identifying aggregated analytic data associated with the corresponding subset of the digital chat conversations that additionally meet a conditional requirement of the corresponding condition step and all of conditional requirements of each of previous steps in the linear sequence of steps.

9. The method of claim 8, wherein the aggregated analytic data includes a corresponding number of users metric associated with a corresponding relative number of users metric as compared to a next step in the linear sequence of steps.

10. The method of claim 8, further comprising:
for at least one step in the linear sequence of steps, displaying a first reference link to the one or more conversations that meet the conditional requirement of the at least one step and a second reference link to the one or more conversations that do not meet the conditional requirement of a next step in the linear sequence of steps.

11. A system, comprising:
one or more processors; and
a memory coupled to the one or more processors, wherein the memory is configured to provide the one or more processors with instructions which when executed cause the one or more processors to:
track and store analytic data about digital chat conversations taking place within a digital workflow environment, wherein the analytic data tracks conversation progression states between individual node elements of at least one digital chat conversation flow design;
receive a specification of an interested event for the analytic data;
extract data associated with the interested event;
provide the extracted data for analysis;
provide a graphical user interface platform for managing monitoring and analysis of the digital chat conversations associated with one or more virtual agents; and
implement a digital specification of a funnel view that defines a linear sequence of condition steps for analyzing the digital chat conversations;
automatically perform the analysis of the extracted data including by causing the one or more processors to determine for each corresponding condition step of a plurality of condition steps included in the linear sequence of condition steps of the funnel view, a corresponding aggregated result of a corresponding subset of the digital chat conversations further meeting the corresponding condition step within a progression of the linear sequence of condition steps of the funnel view that is different from the digital chat conversation flow design; and
automatically provide, via the graphical user interface platform, interactive elements with the corresponding aggregated results of the funnel view for improving an automated response or the digital chat conversation flow design of at least one of the one or more virtual agents.

12. The system of claim 11, wherein the specification of the interested event for the analytic data includes identifiers of a source table, a conversation mapping field, and an interested event condition different from the linear sequence of condition steps.

13. The system of claim 12, wherein the interested event condition is specified as a Boolean condition and references one or more fields of the specified source table.

14. The system of claim 12, wherein the specification of the interested event for the analytic data includes an identifier of an event attribute to track, wherein the event attribute is specified by referencing one or more fields of the specified source table.

15. The system of claim 11, wherein the memory is further configured to provide the one or more processors with instructions which when executed cause the one or more processors to:
apply a script on the analytic data to determine analytic metrics of the digital chat conversations taking place within the digital workflow environment.

16. The system of claim 15, wherein the memory is further configured to provide the one or more processors with instructions which when executed cause the one or more processors to:
receive a specification associated with the script, wherein the received specification associated with the script includes a custom formula script and specifies a database field for tracking the analytic data about the digital chat conversations taking place within the digital workflow environment; and
replace a default formula script with the custom formula script.

17. The system of claim 11, wherein the memory is further configured to provide the one or more processors with instructions which when executed cause the one or more processors to:
present the aggregated result for display via the graphical user interface platform.

18. The system of claim 17, wherein determining the corresponding aggregated result includes:
identifying aggregated analytic data associated with the corresponding subset of the digital chat conversations that additionally meet a conditional requirement of the corresponding condition step and all of conditional requirements of each of previous steps in the linear sequence of steps.

19. The system of claim 18, wherein the memory is further configured to provide the one or more processors with instructions which when executed cause the one or more processors to:
for at least one step in the linear sequence of steps, display a first reference link to the one or more conversations of that meet the conditional requirement of the at least one step and a second reference link to the one or more conversations of that do not meet the conditional requirement of a next step in the linear sequence of steps.

20. A computer program product, the computer program product being embodied in a non-transitory computer readable storage medium and comprising computer instructions for:
- tracking and storing analytic data about digital chat conversations taking place within a digital workflow environment, wherein the analytic data tracks conversation progression states between individual node elements of at least one digital chat conversation flow design;
- receiving a specification of an interested event for the analytic data;
- extracting data associated with the interested event;
- providing the extracted data for analysis;
- providing a graphical user interface platform for managing monitoring and analysis of the digital chat conversations associated with one or more virtual agents; and
- implementing a digital specification of a funnel view that defines a linear sequence of condition steps for analyzing the digital chat conversations;
- automatically performing the analysis of the extracted data including by determining for each corresponding condition step of a plurality of condition steps included in the linear sequence of condition steps of the funnel view a corresponding aggregated result of a corresponding subset of the digital chat conversations further meeting the corresponding condition step within a progression of the linear sequence of condition steps of the funnel view that is different from the digital chat conversation flow design; and
- automatically providing, via the graphical user interface platform, interactive elements with the corresponding aggregated results of the funnel view for improving an automated response or the digital chat conversation flow design of at least one of the one or more virtual agents.

* * * * *